June 8, 1926.
E. E. ROSS
RESILIENT SYSTEM
Filed Sept. 12, 1922
1,587,603
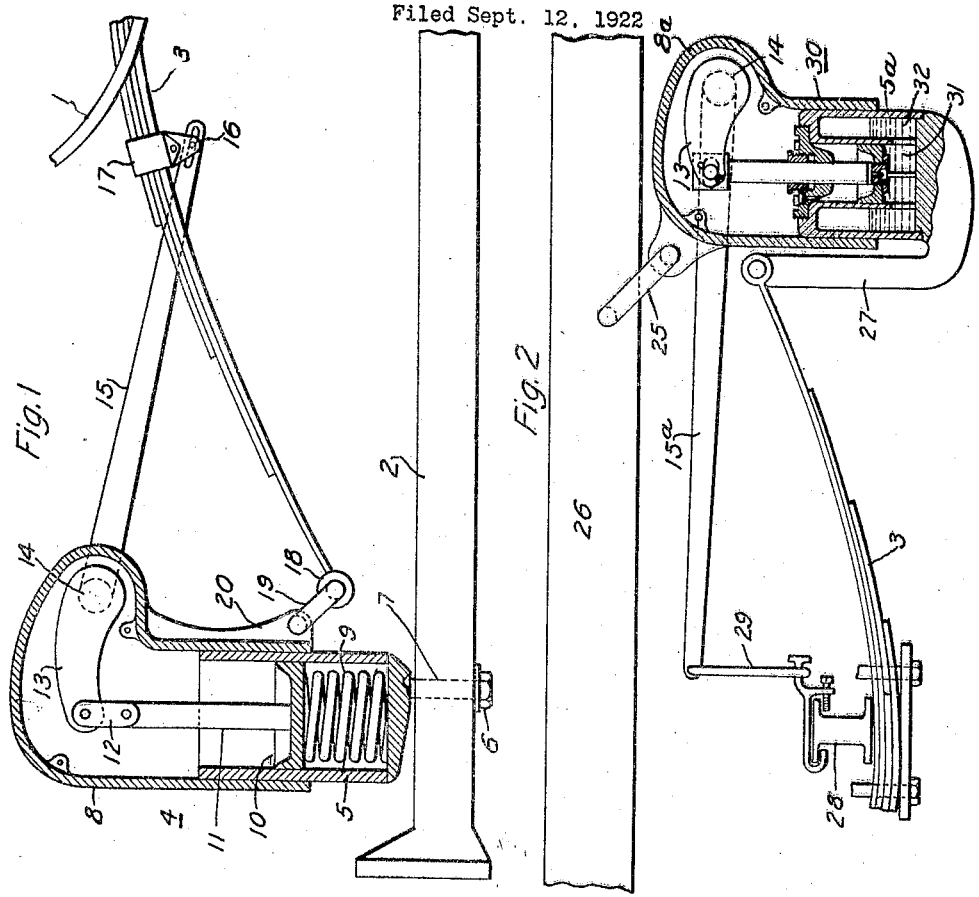
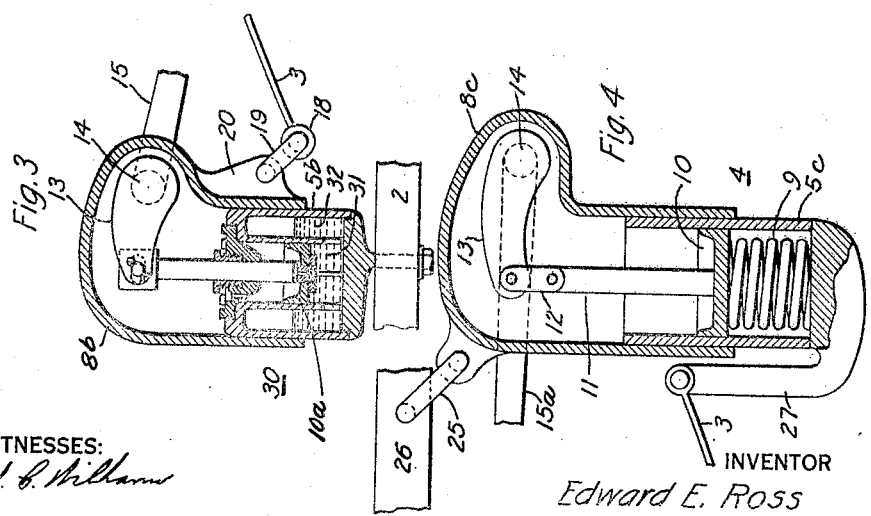
WITNESSES:
Fred C. Williams
CM Cochran
INVENTOR
Edward E. Ross
BY
William R. Coley
ATTORNEY Patented June 8, 1926.

1,587,603

UNITED STATES PATENT OFFICE.

EDWARD E. ROSS, OF WILKINSBURG, PENNSYLVANIA.

RESILIENT SYSTEM.

Application filed September 12, 1922. Serial No. 587,664.

My invention relates to resilient suspension systems for automobiles or other vehicles, and it has particular relation to the prevention of excessive rebound or re-coil of the spring suspension systems thereof.

One object of my invention is to provide a novel method of resiliently supporting a vehicle body employing a main and a secondary resilient member wherein the two resilient members are adapted to assist each other in case of downward movement of the vehicle body and to oppose each other during upward movement thereof.

Another object of my invention is to provide a method of resilient suspension wherein the action of only one resilient member is utilized under conditions of relatively light stress, while the combined action of both resilient devices is utilized under conditions of relatively heavy stress.

A further object of my invention is to provide a method of spring control, wherein the action of a resilient member is controlled partly by the action of the main spring and partly by the movement of the vehicle body or load that is supported by the spring.

More specifically, it is an object of my invention to provide a control device comprising a pair of telescoping cylinders or other members respectively connected to a main spring and to a load member supported thereby, together with a secondary resilient member operating between said cylinders, the arrangement of parts being such that the secondary resilient member may be operated independently of the motion of said cylinders.

Further objects and advantages of my invention will be obvious from the following detailed description taken in conjunction with the accompanying drawings, wherein, Figure 1 is a view, partially in elevation and partially in section of a resilient suspension system constructed in accordance with one form of my invention, as applied to one well-known type of vehicle construction.

Fig. 2 is a similar view of a modified form of resilient device, as applied to another well-known form of vehicle construction.

Fig. 3 is a sectional view of a modification of a portion of the system that is shown in Fig. 1, and Fig. 4 is a view corresponding to Fig. 3 and illustrates a modification of a portion of the system that is shown in Fig. 2.

Referring to Fig. 1 of the drawing, the structure here shown comprises a portion of a vehicle body or frame 1 and of a stationary supporting axle 2 therefor, together with the familiar semi-elliptical or leaf spring 3, with which my resilient device 4 is associated, in a manner to be set forth.

The resilient device 4 comprises a stationary cylindrical member 5, which is suitably secured to the axle 2 as by a nut 6 and pin 7. A second cylindrical member 8 is telescopically associated with the fixed cylindrical member 5, being adapted to slide along the fixed cylinder within certain limits of travel. Inside the fixed cylinder 5, a secondary or relatively weak resilient member or coil spring 9, is disposed, the upper end thereof bearing against a piston member 10, the stem or rod 11 of which is pivotally secured through a link 12 to a crank arm 13 that is suitably journalled or mounted in the upper or movable cylinder 8.

Rigidly secured to the pin 14 of the crank arm 13, outside of the movable cylinder 8, is a lever arm 15, the free end of which is attached, through a lost motion connection 16 to a relatively stiff intermediate portion of the main spring 3 through the agency of a suitable clip or clamping device 17. It will be understood that some other relatively fixed portion of the vehicle may be used as an anchor for the lever arm 15, if desired.

The free end or eye 18 of the main spring 3 is secured through the agency of a link or clevis 19 to a lug 20, near the lower edge of the movable cylinder 8.

In operation, the resilient suspension system illustrated performs a double duty in that it acts as a shock absorber in the case of small irregularities of road surface and also as a rebound check on the vehicle main spring for large irregularities of road surface.

It is well known, that most automobiles are equipped with springs considerably stiffer than required for maximum comfort in riding, since the vehicle must be constructed to withstand over-loading and travelling over unusually bad roads. Small amplitude vibrations are, therefore, transmitted through these stiff springs with but little cushioning effect, as the inertia and high scale of these springs makes them nonresponsive to such conditions when relatively light stress is involved.

On the other hand, large amplitude vibrations cause a deflection of the main springs; but because of their high scale, such springs give a quick violent rebound, which tends, and in many cases, actually does throw passengers up from their seats.

In the operation of a resilient suspension system constructed in accordance with my invention, the small amplitude vibrations are cushioned by the secondary resilient member 9, which also acts as a recoil check to control the rebound of the main spring in the case of large amplitude vibrations, without embodying the defects of prior types of rebound checks. Such usual types of rebound checks either place the main springs under considerable static load or else sacrifice the ability to begin the checking action before the main spring passes through its neutral or normal position during the rebound movement.

The operation of the device illustrated in Fig. 1 may be described as follows:

The vehicle body frame 1 rests, in a familiar manner, upon the main spring 3, which may transmit the load through link 19 to the upper telescoping cylinder 8. This stress is transmitted through the crank arm 13, which is journalled in the cylinder 8, to the piston or plunger 10, and finally through the secondary or relatively weak resilient member 9 to the axle 2.

When the vehicle wheels are passing over small irregularities in the road, relatively small upward acceleration pressures are developed, which would not be sufficient to deflect main spring 3, but are absorbed by my secondary resilient member 9, which allows the lower telescoping cylinder 5 to ride up and down within the upper telescoping cylinder 8. Since there is no deflection of main spring 3, the lever arm 15 does not oscillate, and crank arm 13 is, therefore, fixed with relation to cylinder 8. The effects of such small irregularities of the road surface are thus smoothed out, and substantially no annoying effects are transmitted to the vehicle body proper.

On the other hand, when a large irregularity in the road is encountered, the axle 2 and lower cylinder 5 move upwardly, if necessary, until the full deflection is obtained, transmitting the resultant pressure through piston 10, upper cylinder 8 and link 19 to the free end of the main spring 3. As soon as the main spring 3 correspondingly deflects or straightens out, it carries clip or clamp member 17 downwardly, causing the lever arm 15 to oscillate, with the result that crank arm 13 is thrown upwardly within the cylinder 8. The piston is thus also actuated in an upward direction, tending to release the secondary resilient member 9 until the upper cylinder 8 slides down further over the lower cylinder 5 by reason of the pull of the free end of the main spring 3 on link 19 and the upper cylinder 8.

In this way, the secondary resilient member or spring 9 is again placed under relatively heavy compression. When the main spring 3 occupies the lowest point of its downward stroke or deflection, auxiliary spring 9 is then under a corresponding degree of stress, being held down by the pressure transmitted to upper cylinder 8 and piston 10 by the end of the main spring 3.

As soon as the main spring 3 starts on its upward or re-bound stroke, it tends to raise the clip or clamp member 17, and therefore, the lever arm 15. This lever arm being rigidly associated with crank arm 13, downward pressure on the auxiliary spring 9 is exerted by the crank arm 13 through the piston 10. The auxiliary spring 9 is thus placed under a stress, such that the effective action thereof opposes the action of the main spring 3 during the upward or re-bound stroke thereof. The energy of the re-bound of each of the resilient members is thus, to a certain extent, dissipated in overcoming the resistance of the other and of the friction of the other moving members. As a result, a relatively slow upward thrust of the car body support or frame 1 is produced, and the previously mentioned violent recoil action that occurs in spring suspension systems of the prior art is entirely obviated by the use of my system.

Figure 2 shows a different type of vehicle structure, to which another form of my invention is applied. In the present case, the upper telescoping cylinder $8^a$ is secured by a link 25 to a frame member or support 26 of the vehicle, while the lower telescoping cylinder $5^a$ is provided with an upwardly extending arm 27 to which the free end or eye of the main spring 3 is attached. In the present case, the main spring is reversed in position with respect to that shown in Fig. 1, and the intermediate portion thereof is suitably secured to a transversely extending axle 28. The lever arm $15^a$ has one end rigidly secured to the crank arm 13, which is pivotally attached to the piston $10^a$, while the other end of the lever arm is suitably attached to the axle or support member 28 by means of a swivel link 29, to allow any necessary side sway.

The type of auxiliary resilient member 30 that is illustrated in Fig. 2 is of the combined liquid and air cushion type which is set forth and claimed in my Patent No. 1,378,281.

The principle of operation of this device, briefly stated, is the forcing of liquid from an intermediate chamber 31 to an outer chamber 32, in which a cushion of air is thus entrapped. In view of the full disclosure in my above-noted patent, it is not believed that any further description of the operation of this auxiliary resilient device is necessary for the purposes of the present application.

It will thus be noted that both the main spring and the auxiliary resilient device may be of various types within the scope of the present invention, and that I am not, therefore, limited to either of the illustrated types.

In the system shown in Fig. 2, the downward pressure of the car frame 26 is transmitted directly through link 25 to the upper telescoping cylinder 8ª. In the present case, the lever arm 15ª tends to actuate the crank arm 13 in the same direction as its own motion, thus differing from the relative movement of these parts in the system shown in Fig. 1, by reason of the difference in the type of main spring suspension.

In the operation of the device illustrated in Fig. 2, relatively slight bumps or shocks are absorbed by the supplementary resilient device 30 and do not cause any appreciable deflection of the main spring 3. When a larger bump is encountered, the auxiliary device 30 is first compressed by reason of the upper telescoping cylinder 8ª being slid over the lower cylinder 5ª. The main spring 3 is then deflected or straightened out by the shock, which causes the lever arm 15ª and the rigidly associated crank arm 13 to move upwardly. This action in turn allows the upper cylinder 8ª to slide down further over the lower cylinder 5ª until the main spring 3 has moved to its maximum upper position. As soon as the main spring 3 attempts to return downwardly with respect to the car frame 26, the sudden or violent return thereof is checked by the action of the supplementary resilient device 13 pressing against the plunger 10ª and thereby tending to keep the lever arm 15ª in its upper position to resist downward pull of the axle 28. In this way, the desired opposition of the main and the auxiliary resilient devices during the re-bound stroke is effected in a manner corresponding to that previously described in connection with Fig. 1.

Fig. 3 illustrates the adaptation of my fluid type of spring device, as covered in Patent No. 1,378,281, to the type of vehicle construction that is illustrated in Fig. 1. Suitable upper and lower telescoping cylinders 8ᵇ and 5ᵇ, respectively, are provided. It will be understood that the superior qualities of an air spring with hydraulic damping, as exemplified in the above noted patent rendering this device very suitable for employment as the secondary resilient device.

Fig. 4 illustrates the adaptation of the type of coil spring device that is shown in Fig. 1 to the type of vehicle construction that is illustrated in Fig. 2.

No further description of the operation of the systems partially illustrated in Figs. 3 and 4 is considered necessary.

It will be seen that I have thus provided a resilient suspension system for vehicles wherein a plurality of resilient members are cumulatively related in the event of a downward movement of the vehicle body and are differentially related in case of return movement to prevent a violent rebound effect, whenever relatively large irregularities of road surface are encountered. On the other hand, relatively small shocks are absorbed by one of the resilient devices acting alone.

I do not wish to be restricted to the specific structural details or arrangement of parts herein set forth, as various modifications thereof may be made without departing from the spirit and scope of my invention. I desire, therefore, that only such limitations shall be imposed as are specifically set forth in the appended claims.

I claim as my invention:

1. A resilient control device comprising a cylinder, a resilient member disposed therein, a second cylinder telescopically associated with the first-named cylinder, a lever having one part mechanically associated with said second cylinder and another part with said resilient member, a second resilient member, means for connecting one end of said second resilient member to said telescoping cylinder, and means for independently connecting a relatively stiff portion of said second resilient member to one end of said lever.

2. In a resilient system for a vehicle, the combination with a load member and a main spring secured thereto, of a pair of telescoping cylinders, a secondary resilient member operating therebetween, said cylinders being respectively attached to one end of said spring and to said load member, a plural part lever for causing motion of said secondary resilient member independently of said cylinders, and means for attaching one of said parts to a relatively stationary portion of said vehicle.

3. A resilient system comprising a main spring and a load member, a pair of relatively movable co-operating members respectively connected to said spring and said load member, a secondary resilient member operating between said relatively movable members, and lever means having one end connected to a relatively stiff portion of said main spring for effecting motion of said secondary resilient member independently of said relatively movable members.

4. A resilient control device for a vehicle, comprising a cylinder, a resilient member disposed therein, a second cylinder telescopically associated with the first-named cylinder, a piston bearing on said resilient member, a lever structure pivotally mounted in said telescoping cylinder and loosely secured to said piston, a second resilient member, means for connecting a free end of said second resilient member to one of said cylinders, and means for connecting a relatively fixed portion of said vehicle to one end of said lever structure.

5. In a resilient control device, a main spring, a pair of telescoping cylinders, an auxiliary spring member operating therebetween, means for connecting said main spring to one of said cylinders and a lever directly operating upon said auxiliary member and pivotally attached to one of said telescoping cylinders, the other end of said lever being pivotally attached to a relatively stiff portion of said main spring.

6. A resilient control device comprising a load-supporting member, a pair of telescoping cylinders, an auxiliary spring member operating therebetween, a main spring, means for attaching said main spring to the load and to one of said cylinders, and a lever pivotally attached to said one cylinder, to said auxiliary spring member and to said main spring.

7. In a resilient control system, the combination of a load-supporting member, a main resilient member operating between the load and said supporting member, a pair of telescoping cylinders, an auxiliary resilient member operating therebetween, one of said cylinders being fixed to said supporting member, means for connecting the other cylinder to the main spring, and a lever independently of said means and pivotally connected to the latter cylinder for operating upon said auxiliary resilient member, said lever being pivotally connected to a stiff portion of the main spring.

8. A resilient control device comprising a leaf spring, a pair of telescoping cylinders, an auxiliary spring operating therebetween, one of said cylinders being fixed, and a lever structure, and means for attaching the other cylinder to one end of said leaf spring, said other cylinder acting upon the auxiliary resilient member independently of said means and directly through a pivotal connection with said lever structure.

9. In a resilient system, a load-supporting leaf spring, a pair of telescoping cylinders, an auxiliary resilient member operating therebetween, one of said cylinders being connected to a flexible portion of said leaf spring, a lever having a lost-motion connection to a stiff portion of said leaf spring and pivotally attached to one of said cylinders for directly operating upon said auxiliary resilient member.

In testimony whereof, I have hereunto subscribed my name this 31st day of August 1922.

EDWARD E. ROSS.